UNITED STATES PATENT OFFICE.

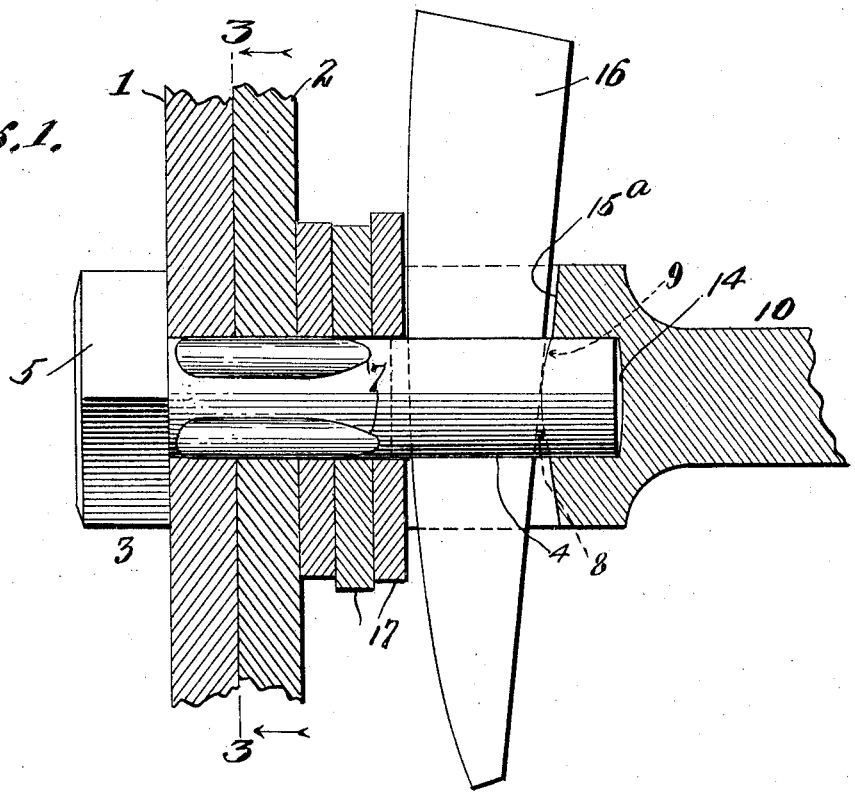

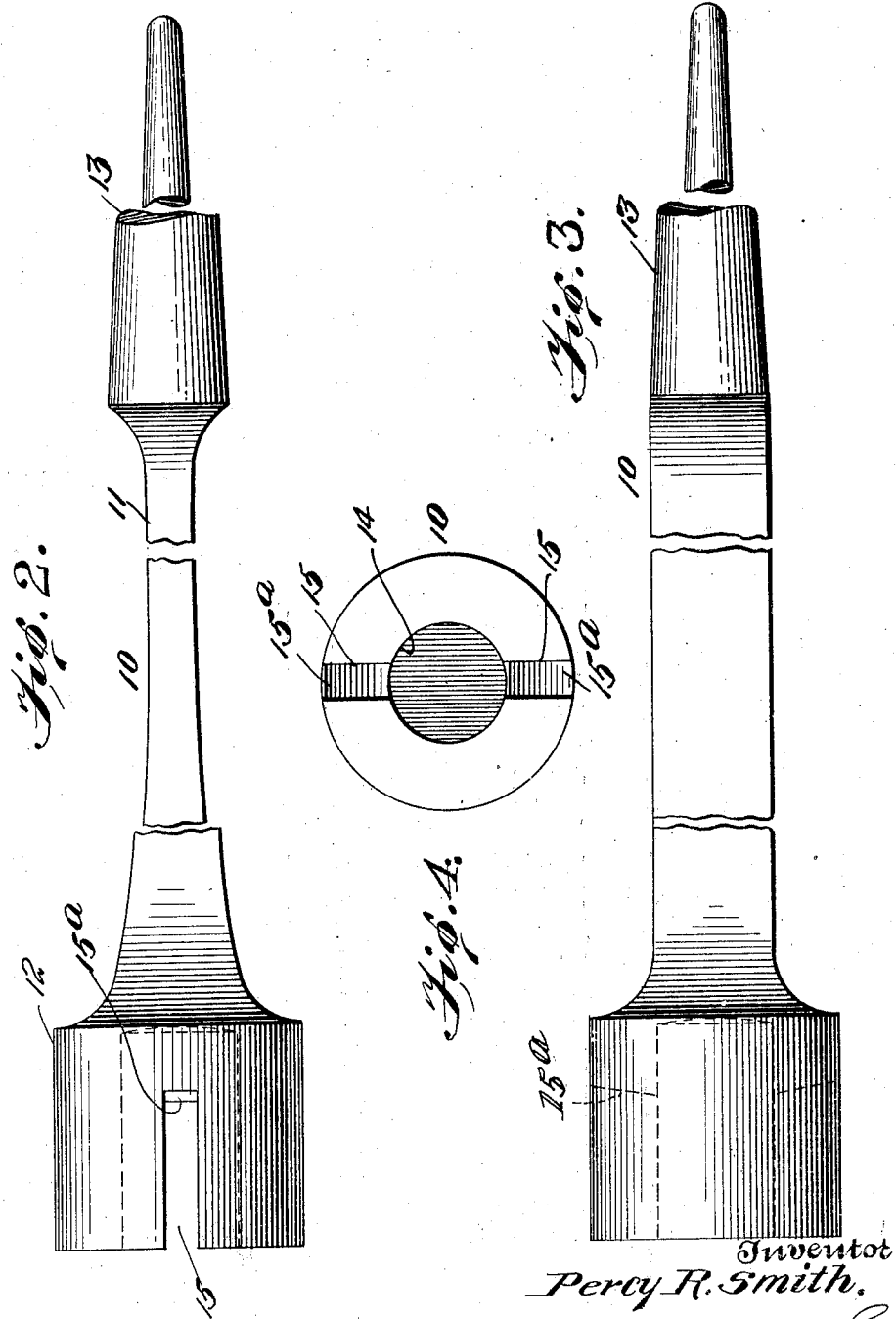

PERCY R. SMITH, OF WASHINGTON, DISTRICT OF COLUMBIA.

BOLT-APPLYING TOOL.

1,362,585.     Specification of Letters Patent.     Patented Dec. 14, 1920.

Application filed November 19, 1919. Serial No. 339,033.

*To all whom it may concern:*

Be it known that I, PERCY R. SMITH, a citizen of the United States, residing at Washington, District of Columbia, have invented certain new and useful Improvements in Bolt-Applying Tools, of which the following is a specification, reference being had therein to the accompanying drawings.

This invention relates to a device for simplifying the efficient fastening of the plates of a ship. The object of the invention is the provision of means for efficiently fastening up plates and other structural steel work prior to the plates being permanently fastened by riveting or other means.

With these and other objects in view, my invention comprises certain novel combinations, constructions, and arrangements of parts as will be hereinafter fully described, illustrated in the accompanying drawings, and more particularly pointed out in the appended claims.

Referring to the drawings:

Figure 1 is a fragmentary sectional view of two plates, the filler washers, and one of my devices, showing my improved bolt in side elevation on the plates and washers.

Fig. 2 is a view in side elevation of my improved "wrench" or tool, while

Fig. 3 is a similar view of the tool taken at right angles to the position shown in Fig. 2.

Fig. 4 is a view looking at the socket end of the tool.

Referring to the drawings by numerals, my tool 10 comprises a handle 11, having at one end, a socket portion 12 and at its other end a tapering grip 13. This grip tapers to its point so that it can be used to ram out a bolt or used as a drift-pin to aline the holes, and the grip 13 can be used for other purposes, if desired. The socket portion 12 is provided with a socket 14 and with a transversely-alined slot 15; the slot 15 registers with the elongated aperature 8 of the bolt (Fig. 1), and the inner ends of the slots are beveled outwardly at 15ª, so that the wedge 16 will readily ride down the surface 15ª, from either side of the socket portion, and then come in contact with the convex surface 9 of the aperture 8, causing the wedge 16 to bear against the inner face of the inner washer, and as the wedge 16 is driven farther into the aperture 8, it will force the plates 1 and 2 and filler washers 17 more tightly together, holding the plates in an efficient assembled position.

Referring to Fig. 1, 2 designates the outer plates, and 1 the inner ship plate. It is desired to hold these plates snugly together, in alinement and to facilitate this operation, I place a bolt 3 in the registering apertures in the plates 1 and 2, after which the filler washers 17 are placed on the bolt and then the wedge 16 is fastened in the aperture 8, as described.

The tool 10 has the inner end of the shank 4 of the bolt 3 extending into its socket 14, and by reason of the socket portion 12 straddling the bolt and the wedge 16, I find that the tool takes the lateral strain from the end of the bolt while wedge 16 is being driven, and also keeps the wedge straight and enables the riveting process of the plates to be more satisfactorily and efficiently accomplished.

It is to be understood that the shank 4 of the bolt 3 is to be made of any suitable kind or metal, such as "mild" steel, and that the wedge 16 is preferably to be made of boiler plate scrap.

While I have described the preferred embodiment of my invention and have illustrated the same in the accompanying drawings, certain minor alterations or changes may be found desirable when extensively manufacturing the invention, and I, therefore, reserve the right to make such alterations or changes as shall appear to one skilled in the art to which this invention relates, and as will fairly fall within the scope of the appended claims.

What I claims is:

1. A tool of the class described, comprising a handle having at one end a socket portion, said socket portion provided with a socket, said socket portion provided with a transversely-alined slot communicating with said socket, and said slot having at its inner end a beveled or convex surface.

2. As a new article of manufacture, a tool of the class described, comprising a handle provided at one end with a socket portion, said socket portion provided with a socket and with a slot passing transversely through the socket, said socket being of greater length than said slot and closed at its inner end, and said slot provided at its inner end with a convex surface extending from opposite sides of the socket, substantially as shown and described.

In testimony whereof I hereunto affix my signature.

PERCY R. SMITH